United States Patent [19]

Richtenburg et al.

[11] Patent Number: 4,804,520
[45] Date of Patent: Feb. 14, 1989

[54] WARM GAS ACCUMULATOR

[75] Inventors: William J. Richtenburg, Woodland Hills; Donald S. Jenkins, Tarzana, both of Calif.

[73] Assignee: Rockwell International Corporation, El Segundo, Calif.

[21] Appl. No.: 548,526

[22] Filed: Nov. 3, 1983

[51] Int. Cl.$^4$ ............................................. B01J 8/02
[52] U.S. Cl. .................................. 422/112; 165/132; 422/203; 422/211; 422/311
[58] Field of Search ............... 422/113, 203, 311, 112; 165/132

[56] References Cited

U.S. PATENT DOCUMENTS

| | | | |
|---|---|---|---|
| 3,170,290 | 2/1965 | Nasa | 60/35.6 |
| 3,181,937 | 5/1965 | Cox | 44/2 |
| 3,779,009 | 12/1923 | Friedman | 60/217 |
| 3,856,078 | 12/1974 | Dahl | 165/132 |

OTHER PUBLICATIONS

Design of Liquid Propellant Rocket Engines, Huzel and Huang, NASA, 1971, 2nd Ed.; pp. 157-158.

Primary Examiner—Michael S. Marcus
Attorney, Agent, or Firm—H. Fredrick Hamann; Harry B. Field; Lawrence N. Ginsberg

[57] ABSTRACT

A warm gas accumulator system 10 suitable for use in guidance vane-actuator systems of missiles comprising a tank 12 containing a supply of Tridyne gas, which tank 12 includes an internally mounted catalytic bed 26 and an internally mounted heat exchanger 18. A portion of the flow of Tridyne gas being discharged from the tank is first directed through the catalytic bed 26 and heat exchanger 18 for purposes of generating and transferring heat to the remainder of the contained Tridyne gas. Upon completing its circuit, the diverted portion of the flow is then mixed with the undiverted portion of the flow prior to discharge from the tank for pusposes of improving the volumetric flow rate of warm gas accumulator system 10.

12 Claims, 2 Drawing Sheets

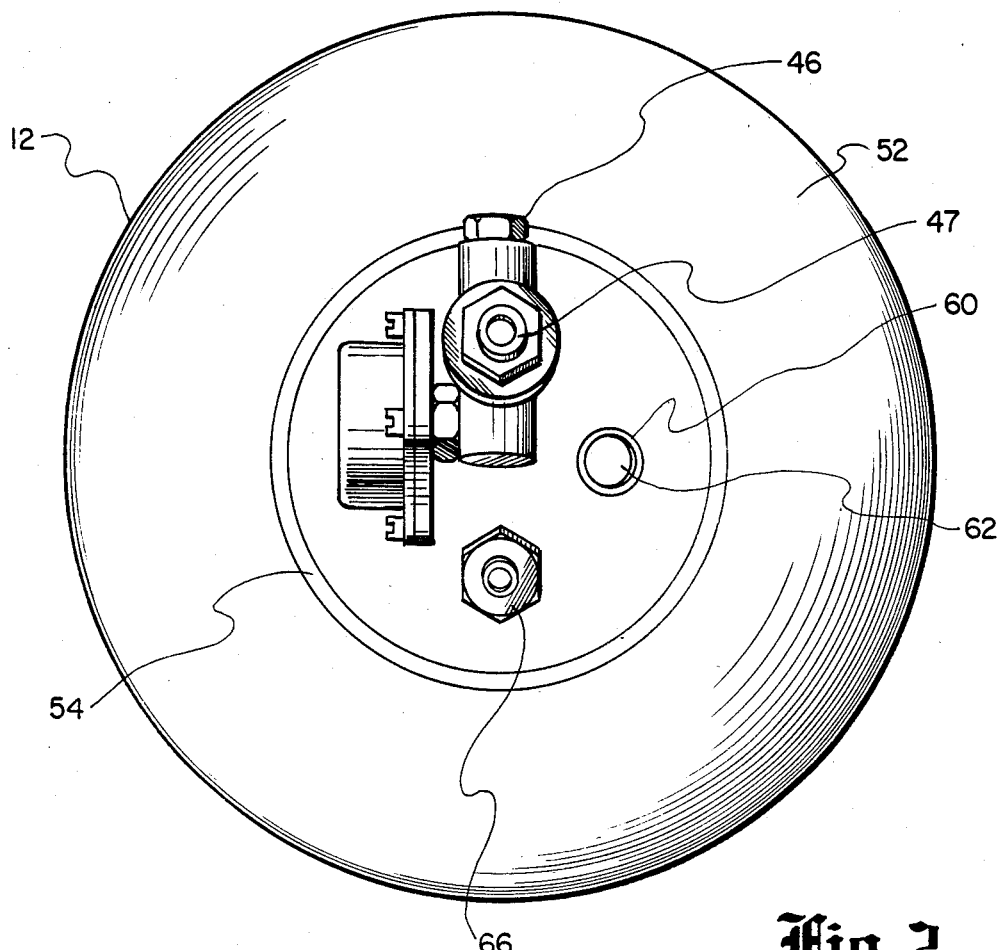
Fig.2.
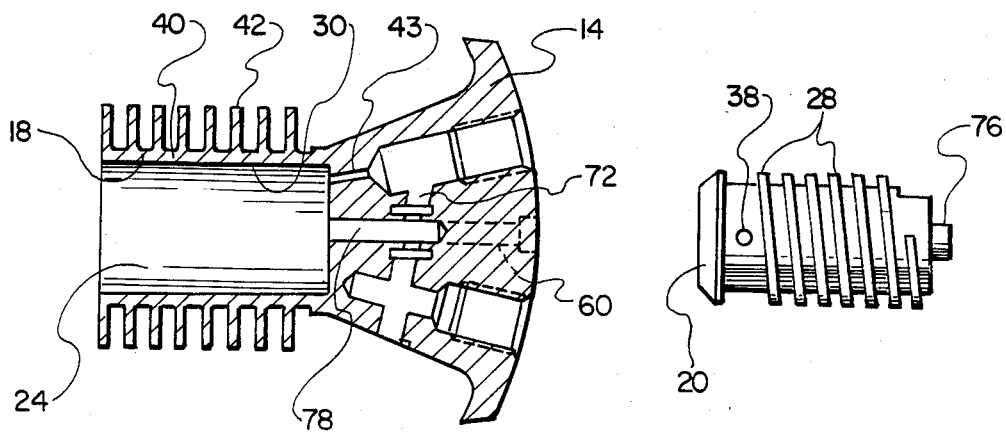
Fig.3.
Fig.4.

WARM GAS ACCUMULATOR

BACKGROUND OF THE INVENTION

1. Field of the Invention

The present invention relates generally to pneumatic accumulators and specifically to pneumatic accumulators suitable for use on missile systems which employ heat exchangers.

2. Background of the Invention

An existing air-to-ground missile system utilizes a gaseous nitrogen accumulator as a source of pneumatic working fluid for pressurizing its guidance-vane actuators. There is now interest in developing an extended range version of the system which would offer improved flight time and endurance. These improvements will require the development of a new accumulator which can provide pneumatic fluid at acceptable pressures and temperatures for greater periods of time than that provided by the original gaseous nitrogen accumulator. Additionally, these requirements must be met without adding significant weight to the missile system while also minimizing size and complication of the accumulator. Moreover, any prospective accumulator must supply the working fluid at a temperature lower than that which will damage the plastic components of the actuators (about 400° F.). The gaseous nitrogen accumulator has proven unsuitable for the newer version of the missile because its duration could be extended only by making it unacceptably large and heavy. The gaseous nitrogen accumulator also suffers the disadvantage that the temperature of the contained nitrogen falls off rapidly as nitrogen gas is discharged therefrom, which effect shortens duration, reduces the volumetric flow rate and causes a significant amount of residual nitrogen to remain unused within the system.

With respect to the problem of residual gas, the prior practice has been to provide the storage tank of gaseous accumulator systems with internal heat exchangers through which a heated, secondary fluid is circulated. The heat extracted from the secondary fluid serves to allay the drop in temperature resulting from the rapid discharge of fluid from the storage tank. However, these systems require a second storage tank for containing a supply of the secondary fluid and also means for heating the secondary fluid. The latter element usually comprises ducting leading through a section of the rocket combustor and/or thrust chamber and in other arrangements, might comprise a gas generator. Any of these arrangements adds significant complication and weight to the overall missile system, and the ducting through the storage tank itself creates further problems in regard to sealing the entrance and the exit of the ducts through the primary storage tank. Moreover, in many prior art arrangements, significant danger of explosion arises if the secondary fluid and the contained fluid were ever to mix and thus, such systems present a cognizable risk of catastrophic engine failure.

OBJECTS OF THE INVENTION

Therefore, it is an object of the present invention to provide an accumulator which is compact, yet capable of supplying pressurized working fluid over an extended period of time in an extended range missile.

It is a further object of the present invention to provide an accumulator which minimizes residual fluid and maximizes the supply of useable fluid.

It is yet another object of the present invention to provide an accumulator which has an internal heating element which minimizes both the likelihood and the consequences of leaks occurring within the internal heating element.

Still another object of the present invention is to provide an accumulator with an internal heating arrangement which does not present a risk of catastrophic engine failure in the event of leakage.

It is still another object of the present invention to provide an accumulator for a missile system, which accumulator can provide working fluid to the missile system at a high volumetric flow rate without exceeding the temperature limitations of plastic components in the missile.

It is another object of the present invention to provide an accumulator system which can supply heat to its storage tank without the addition of a second tank or an external heat-generating means.

It is still a further object of the present invention to provide an accumulator which can meet the performance requirements of advanced missile systems without adding bulk or complication to same.

SUMMARY OF THE INVENTION

The present invention achieves these and other objects by providing a warm gas accumulator system suitable for use in guidance vane-actuator systems of missiles comprising a tank containing a supply of Tridyne gas, which tank includes an internally mounted catalytic bed and an internally mounted heat exchanger. A portion of the flow of Tridyne gas being discharged from the tank is first directed through the catalytic bed and heat exchanger for purposes of generating and transferring heat to the remainder of the contained Tridyne gas. Upon completing its circuit, the diverted portion of the flow is then mixed with the undiverted portion of the flow prior to discharge from the tank for purposes of improving the volumetric flow rate of the accumulator system.

Other objects, advantages and novel features of the present invention will become apparent from the following detailed description of the invention when considered in conjunction with the accompanying drawings.

BRIEF DESCRIPTION OF THE DRAWINGS

FIG. 2 is an end view of the accumulator system of FIG. 1 showing the arrangement of orifices leading into the housing element.

FIG. 3 is a cross-sectional view of the housing element of the accumulator system of FIG. 1.

FIG. 4 is a side-view of the holder element of the accumulator system of FIG. 1.

DETAILED DESCRIPTION OF THE PREFERRED EMBODIMENT

Figure 1:
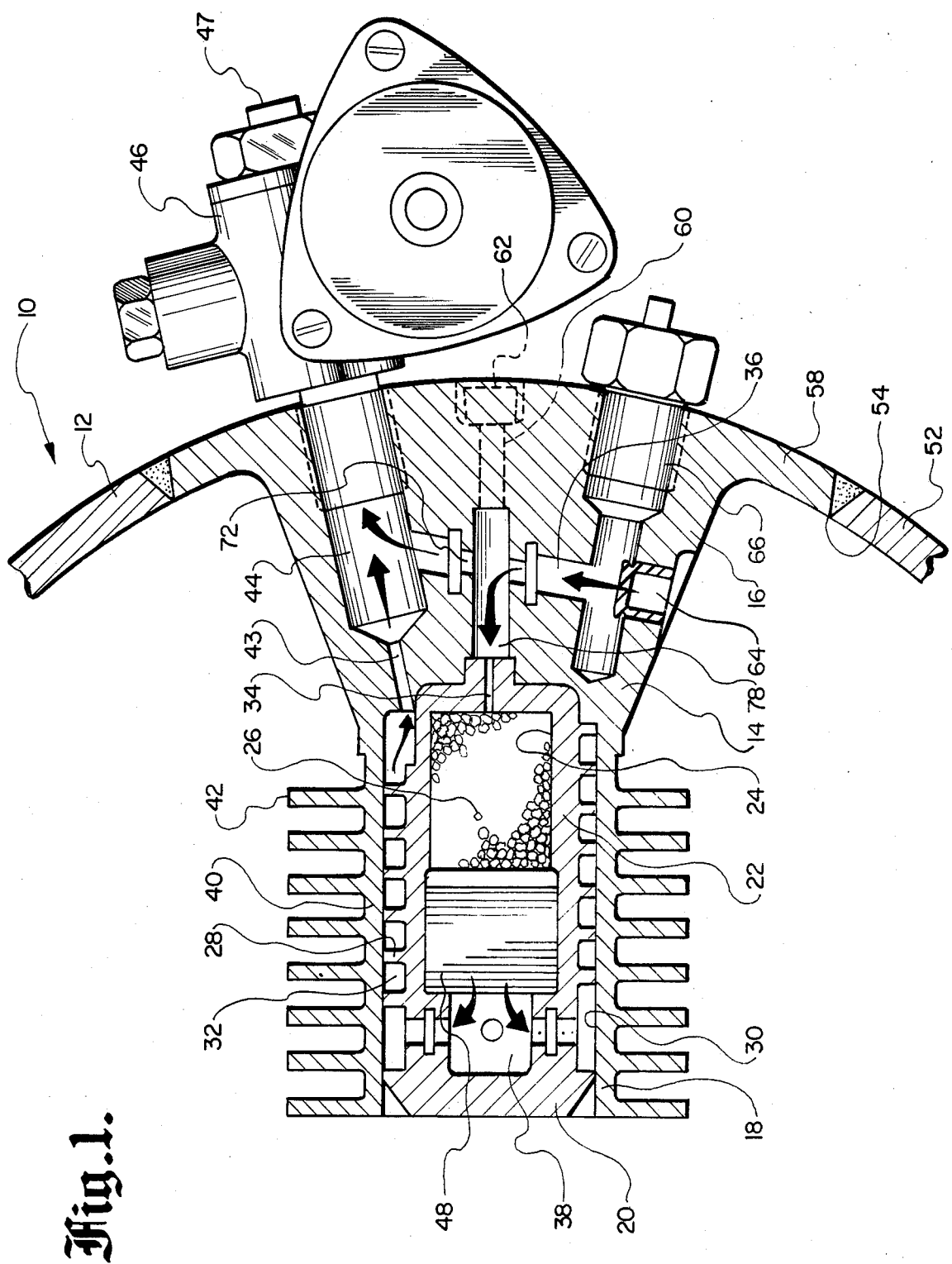
FIG. 1 is a partial, cross-sectional view of an accumulator system constructed according to the preferred embodiment of the present invention.

Referring to FIG. 1, there is provided a warm gas accumulator system 10 constructed according to the preferred embodiment of the present invention, which comprises a tank shell 12 for containing a supply of Tridyne fluid under pressure, a housing element 14 extending into tank shell 12 and comprising base portion 16 and a cupped portion 18 inwardly projected from the base portion, a holder element 20 having walls 22 for defining a internal chamber 24 for containing a catalytic bed 26 and a spiralled rib 28 about the exterior of walls 22 which, in conjunction with interior surfaces 30 of housing element 14, define helical channel 32. Diverting orifice 34 in holder element 20 diverts a pre-selected portion of the flow being discharged through discharge port 36 and directs the diverted, secondary flow into internal chamber 24. During its passage through catalytic bed 26, the Tridyne fluid of the diverted flow undergoes an exothermal reaction in the presence of the catalyst contained therein and the diverted flow becomes heated to about 1500° F., depending upon the type of Tridyne gas used. It then exits internal chamber 24 through plenum 38 to then enter helical channel 32. In circulating through helical channel 32, heat is transferred from the diverted flow, through walls 40 of housing element 14 and into the remaining portion of the Tridyne fluid contained within tank shell 12. Fins 42 are provided at the exterior of walls 40 of housing element 14 to enhance the rate of heat transfer to the contained Tridyne fluid. Upon completion of its circuit through helical channel 32, the diverted flow of Tridyne fluid passes through orifice 43 which discharges the diverted flow into mixing region 44 of discharge port 36 wherein the warmer diverted flow mixes with the undiverted portion of the discharge flow so that the temperature of the fluid exiting tank shell 12 is maintained at an output temperature preferably approaching 400° F. This particular output temperature was pre-selected for the preferred embodiment of the present invention because it is the maximum temperature which plastic missile components can endure. Of course, in other applications, a different output temperature might be desired, and the steps to be taken for adjusting the design of the preferred embodiment to achieve those other temperatures are set forth in later portions of this description. Upon leaving tank shell 12, the mixed Tridyne fluid passes through pressure regulator 46 which regulates the output pressure of the flow of Tridyne fluid being supplied to the subject missile components requiring pneumatic drive (not shown). Regulator 46 discharges the Tridyne fluid out port 47.

Tridyne gas comprises a mixture of an inert gas and small fractions of fuel and oxidizer, which mixture is non-reactive under ordinary conditions but becomes reactive upon exposure to a catalyst to provide a heated gas. Its makeup and general characteristics are described in detail in U.S. Pat. No. 3,779,009—CATALYTIC METHOD OF PRODUCING HIGH TEMPERATURE GASES incorporated herein by reference. Although Tridyne gas can comprise a wide range of mixtures (see. U.S. Pat. No. 3,779,009) the preferred mixture for purposes of the present invention is 82.6% $N_2$, 5.8% $O_2$ and 11.6% $H_2$ (by volume). However, the term "Tridyne fluid" shall herein refer to any mixture falling within the ambit of those described in U.S. Pat. No. 3,779,009.

The catalyst used in catalytic bed 26 comprises a noble metal such as gold, silver, mercury, platinum, palladium, iridium, rhodium, ruthenium or osmium or mixtures thereof. A desirable catalyst is MFSA which is manufactured by Englehardt Industries. This catalyst comprises an alumina base with platinum, rhodium and lead deposited thereon. The catalyst comes in the shape of porous spheres over which the Tridyne fluid is passed. A typical, but non-limiting, example of a catalytic system is a catalyst of platinum, lead and rhodium impregnated on an alumina pellet nominally 1/16 inch in diameter. Generally, a variety of porous shapes, sizes and mixtures of the catalyst can be successfully employed for the desired thermal response as are further described in U.S. Pat. No. 3,779,009. Referring to FIG. 1, catalytic bed 26 includes filter 48 constructed from Monel wire mesh.

Referring to FIGS. 1 and 2, tank shell 12 is preferably spherical and constructed from welded hemispherical shells, one of the shells being indicated at 52. Of course, tank shell 52 could be given any other shape or manner of construction without departing from the practice of this invention. Edge 54 on hemispherical shell 52 defines circular opening for receiving housing element 14. Base portion 16 of housing element 14 is provided with flange 58 to be fitted against edge 54 and welded in place. Passing through base portion 16 is charging port 60 which exits directly into interior of tank shell 12. Charging port 60 allows tank shell 12 to be charged and then sealingly plugged by plug 62 in charging port 60 and shear plug 64 in discharge port 36. Actuation of accumulator system 10 is effected by the discharge of squib valve 66 which causes shear plug 64 to be sheared open. Upon actuation, a discharge flow of Tridyne fluid begins passing through discharge port 36 wherefrom a portion of the discharge flow is diverted by diverter orifice 34 into catalytic bed 26. The remainder of the discharge flow passes through by-pass orifice 72. The ratio of the areas of by-pass orifice 72 and diverter orifice 34 determines the ratio at which cold Tridyne fluid will mix with the warmer, reacted Tridyne fluid at mixing region 44 of discharge port 36. Thus, the area ratio substantially determines the output temperature of the fluid supplied by accumulator system 10. The area ratio for the preferred embodiment is about 3.75.

Referring now to FIGS. 1, 3 and 4, cupped portion 18 of housing element 14 has interior surfaces 30 for engaging spiralled rib 28 of holder element 20 to form helical return channel 32. Nibble 76 of holder element 20 encases diverter orifice 34 and sealingly engages the walls of diverting channel 78 which leads from discharge port 36 to internal chamber 24. Although diverter orifice 34 is preferably formed within nibble 76 of holder element 20, it could be formed instead within diverting channel 78 of housing element 14. Holder element 20 is welded or brazed into position within cupped portion 18 of housing element 14.

As the diverted flow of Tridyne gas passes through catalytic bed 26 it reacts chemically to achieve a temperature of around 1430° F. at design conditions (600 psia, 70° F.). The diverted flow then circulates through helical channel 32 and transfers heat therethrough to the remaining Tridyne fluid in tank shell 12 to thereby minimize the amount of residual Tridyne fluid which might otherwise remain in accumulator system 10. The diverted flow is then returned to the undiverted portion of the discharge flow and mixed therewith to thereby elevate the temperature of the Tridyne fluid being discharged from tank shell 12. As a result of this temperature adjustment, the volumetric flowrate of accumulator system 10 is increased and its mass flowrate is decreased. Thusly, not only does accumulator system 10 provide improved performance in terms of extended operational capacity, improved volumetric flow rate and the minimization of residual gas, but it does so through means wholly internalized within tank shell 12 so that it is easily packaged within the cramped confines of missile systems and the like.

Furthermore, warm gas accumulator 10 does not create any risk of explosion should it develop any internal leaks either during storage or during its operation. This favorable result is achieved both because of the non-explosive nature of the Tridyne gas and because of the internalization of catalytic bed 26 and the system's heat exchanging means, which generally comprises cupped portion 18 of housing element 14 and helical channel 32. If a leak occurs during storage, Tridyne fluid slowly fills internal chamber 24 and helical channel 32 without over-pressurizing tank shell 12 and without causing explosion. Eventually, the leakage flow stops as the leaked fluid reaches equilibrium with the Tridyne fluid remaining in tank shell 12. If a leak occurs during operation, the flow rate of hot, reacted Tridyne gas into mixing region 44 is still controlled by orifice 43 which is upstream from catalytic bed 26. Thus, even if there is a leak into catalytic bed 26, the output temperature of the working fluid discharged from system 10 is not allowed to go beyond the allowable output temperature.

Even after diverter orifice 34 and by-pass orifice 72 have been set, the temperature of the fluid being discharged from accumulator system 10 can be adjusted by changing the formulation of the Tridyne fluid. For instance, when it is desired that the output temperature be lowered, the fractions of molecular hydrogen and oxygen can be reduced in the Tridyne mixture. The opposite can be done if the output temperature needed to be raised. This latter capability is especially useful, because the higher output temperature increases volumetric flowrate, reduces mass flowrate and thus extends operational duration. With this means of adjustment, accumulator system 10 can be finely-tuned so that it supplies fluid at a temperature just under the maximum temperature which can be tolerated by the vane actuators or the pressure regulator. In some instances, it might be preferable to wholly close-off by-pass orifice 72 so that all of the output flow is channelled through catalytic bed 26. This arrangement is especially advantageous when operational duration is to be maximized and the pressure regulator and the missile components to be driven by the Tridyne fluid can withstand the higher output temperatures.

Obviously, many modifications and variations of the present invention are possible in light of the above teachings. It is therefore to be understood that, within the scope of the appended claims, the invention may be practiced otherwise than as specifically described. Moreover, warm gas accumulator system 10 is readily adaptable to uses other than the pressurization of guidance-vane actuators in missile systems. For example, it is highly suitable for driving turbines in auxiliary power units, air motors or the like, and could readily be used as the means for pressurizing the main tanks of a large missile system. Because of its outstanding performance and safety in operation, its scope of application is extremely broad, both within the aerospace field and outside of same.

What is claimed and desired to be secured by Letters Patent of the United States is:

1. An accumulator system, comprising:
   a tank shell for containing a supply of working fluid, said working fluid being exothermally reactive in the presence of a catalyst;
   a housing, sealably connected with and extending into said tank shell, including:
   (a) a discharge port oriented within said housing for discharging a flow of said working fluid through said housing; and
   (b) means for diverting at least a portion of said discharging working fluid into a first diverted and a second portion;
   a heat exchanger internal said tank shell and connected with said housing wherein said heat exchanger includes:
   (a) a catalytic bed within said heat exchanger for receiving and heating said first diverted portion of said working fluid;
   (b) a holder for securely containing said catalytic bed within said heat exchanger; and
   (c) means for transferring a portion of the heat generated in said first diverted portion of said working fluid to the remainder of said contained working fluid; and
   means within said housing for recombining said first diverted portion and said second portion of said working fluid for controlling the output temperature of said discharging working fluid;
   whereby, raising the output temperature of the discharging flow and heating the remainder of said working fluid increases the volumetric flow rate of the accumulator and minimizes the amount of residual gas within the tank shell.

2. The accumulator system of claim 1 wherein said catalyst bed is comprised of a chemical being selected from the group consisting of platinum, palladium, iridium, rhodium, ruthenium, osmium, and mixtures thereof.

3. The accumulator system of claim 1 wherein said catalyst bed is comprised of MFSA.

4. The accumulator system of claim 1 further comprising a pressure regulator connected to said housing for regulating the pressure of said outlet flow.

5. The accumulator system of claim 1 further comprising:
   a shear plug in said discharge port for maintaining the accumulator in a closed condition until actuated; and
   means for shearng said shear plug to actuate the accumulator as desired.

6. The accumulator system of claim 1 wherein said working fluid is a Tridyne fluid.

7. The accumulator system of claim 6 wherein the composition of said Tridyne fluid is approximately 82.6% $N_2$, 5.8% $O_2$, and 11.6% $H_2$.

8. The accumulator system of claim 1 wherein said housing further comprises:
   a closeable port which exits directly into the interior of said tank shell for charging said tank shell with working fluid.

9. The accumulator system of claim 8 wherein said housing comprises a base porton for defining said discharge port, said closeable port, and said diverting means.

10. The accumulator system of claim 9 wherein said housing further comprises:
    a cupped portion, inwardly projecting from said base portion, having interior surfaces for receiving said holder and a finned exterior surface wherein said fins provide said means for transferring a portion of the heat generated in said first diverted portion of said working fluid.

11. The accumulator system of claim 10 wherein said holder comprises:

walls defining an internal chamber for containing said catalytic bed;
a rib about the exterior of said walls for contacting said interior surfaces of said cupped portion to define a return channel for said first diverted portion of working fluid; and
a plenum for receiving said first diverted portion of working fluid from said catalytic bed and directing it from said internal chamber to said return channel.

12. An accumulator system, comprising:
a tank shell for containing a supply of working fluid, said working fluid being exothermally reactive in the presence of a catalyst;
a housing, sealably connected with and extending into said tank shell, including:
  (a) a base portion, welded to said tank shell, having a discharge port for discharging a flow of said working fluid through said housing and means proximate said discharge port for diverting at least a portion of said discharging working fluid into a first diverted and a second portion; and
  (b) a cupped portion, inwardly projected from said base portion, having interior surfaces and a finned exterior surface wherein said finned exterior surface provides means for transferring heat from said cupped portion to the remainder of said contained working fluid;
a catalytic bed for receiving and heating said first diverted portion of said working fluid;
a holder element securely emplaced within said cupped portion of said housing, including;
  (a) walls defining an internal chamber for containing said catalytic bed;
  (b) a rib about the exterior of said walls for contacting said interior surfaces of said cupped portion to define a return channel for said first diverted portion of working fluid; and
  (c) a plenum for receiving said first diverted portion of working fluid from said catalytic bed and directing it from said internal chamber to said return channel; and
means connected to said return channel, for recombining said first diverted and said second portion of said working fluid for controlling the output temperature of said discharging working fluid;
whereby, raising the output temperature of the discharging flow and heating the remainder of said working fluid increases the volumetric flow rate of accumulator and minimizes the amount of residual gas within the tank shell.

* * * * *